(12) United States Patent
Gokmen et al.

(10) Patent No.: US 10,748,064 B2
(45) Date of Patent: Aug. 18, 2020

(54) DEEP NEURAL NETWORK TRAINING WITH NATIVE DEVICES

(71) Applicant: INTERNATIONAL BUSINESS MACHINES CORPORATION, Armonk, NY (US)

(72) Inventors: Tayfun Gokmen, Briarcliff Manor, NY (US); Seyoung Kim, White Plains, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 874 days.

(21) Appl. No.: 14/837,798

(22) Filed: Aug. 27, 2015

(65) Prior Publication Data

US 2017/0061281 A1 Mar. 2, 2017

(51) Int. Cl.
*G06N 3/08* (2006.01)
*G06N 3/063* (2006.01)

(52) U.S. Cl.
CPC ........... *G06N 3/084* (2013.01); *G06N 3/0635* (2013.01)

(58) Field of Classification Search
CPC ..... G06N 3/0445; G06N 3/084; G06N 3/0635
See application file for complete search history.

(56) References Cited

U.S. PATENT DOCUMENTS

| | | | |
|---|---|---|---|
| 5,101,361 A | 3/1992 | Eberhardt | |
| 5,237,210 A | 8/1993 | Castro | |
| 5,283,855 A | 2/1994 | Motomura et al. | |
| 6,463,438 B1* | 10/2002 | Veltri | G06K 9/0014 |
| | | | 706/15 |
| 6,876,989 B2 | 4/2005 | Shi et al. | |
| 8,275,722 B2 | 9/2012 | Jhala et al. | |
| 8,275,727 B2 | 9/2012 | Elmegreen et al. | |
| 8,832,010 B2 | 9/2014 | Rajendran et al. | |
| 9,466,362 B2* | 10/2016 | Yu | G11C 13/0026 |
| 9,792,547 B2* | 10/2017 | Nishitani | G06N 3/063 |
| 2010/0223220 A1* | 9/2010 | Modha | G06N 3/0635 |
| | | | 706/33 |
| 2015/0006455 A1 | 1/2015 | Suri et al. | |
| 2015/0039545 A1* | 2/2015 | Li | G05B 13/027 |
| | | | 706/23 |

OTHER PUBLICATIONS

Shyam Prasad Adhikari, Hyongsuk Kim, Ram Kaji Budhathoki, Changju Yang, and Leon O. Chua, "A Circuit-Based Learning Architecture for Multilayer Neural Networks With Memristor Bridge Synapses", Jan. 2015, IEEE Transactions on Circuits and Systems-I: Regular Papers, vol. 62, No. 1. pp. 215-223.*

(Continued)

*Primary Examiner* — Kamran Afshar
*Assistant Examiner* — Ying Yu Chen
(74) *Attorney, Agent, or Firm* — Tutunjian & Bitetto, P.C.; Vazken Alexanian (57) ABSTRACT

An artificial neural network and methods for performing computations on an artificial neural network include multiple neurons, including a layer of input neurons, one or more layers of hidden neurons, and a layer of output neurons. Arrays of weights are configured to accept voltage pulses from a first layer of neurons and to output current to a second layer of neurons during a feed forward operation. Each array of weights includes multiple resistive processing units having respective settable resistances.

20 Claims, 6 Drawing Sheets

(56) References Cited

OTHER PUBLICATIONS

Raqibul Hasan and Tarek M. Taha, "Enabling Back Propagation Training of Memristor Crossbar Neuromorphic Processors", 2014, IEEE, 2014 International Joint Conference on Neural Networks (IJCNN), p. 21-28. (Year: 2014).*

Boxun Li, Yuzhi Wang, Yu Wang, Yiran Chen, and Huazhong Yang, "Training Itself: Mixed-signal Training Acceleration for Memristor-based Neural Network", Jan. 2014, IEEE, pp. 361-366. (Year: 2014).*

Daniel Soudry, Dotan Di Castro, Asaf Gal, Avinoam Kolodny, and Shahar Kvatinsky, "Mennristor-Based Multilayer Neural Networks With Online Gradient Descent Training", Jan. 14, 2015, IEEE, pp. 2408-2421. (Year: 2015).*

T. Serrano-Gotarredona, T. Masquelier, T. Prodromakis, G. Indiveri, and B.Linares-Barranco, "STDP and STDP variations with memristors for spiking neuromorphic learning systems", Feb. 18, 2013, Frontiers in Neuroscience vol. 7 | Article 2, pp. 1-15. (Year: 2013).*

Yu Nishitani, Yukihiro Kaneko, and Michihito Ueda, "Supervised Learning Using Spike-Timing-Dependent Plasticity of Memristive Synapses", Feb. 24, 2015, IEEE Transactions on Neural Networks and Learning Systems vol. 26, Issue: 12, pp. 2999-3008. (Year: 2015).*

G. W. Burr et al., "Experimental demonstration and tolerancing of a large-scale neural network (165,000 synapses), using phase-change memory as the synaptic weight element," IEEE International Electron Devices Meeting (IEDM), Dec. 15-17, 2014, pp. 29.5.1-29.5.4.

J.-W. Jang et al., "Optimization of Conductance Change in Pr1-x Ca xMnO3-based Synaptic Devices for Neuromorphic Systems," IEEE Electron Device Letters, Apr. 2, 2015, pp. 1-3.

B. Rajendran et al., "Specifications of nanoscale devices and circuits for neuromorphic computational systems," IEEE Transactions on Electron Devices, Jan. 2013, pp. 246-253, vol. 60, No. 1.

D. E. Rumelhart et al., "Learning representations by back-propagating errors," Letters to Nature, Oct. 1986, pp. 533-536, vol. 323.

L. Chua, "Resistance switching memories are memristors," Appl Phys A, Materials Science & Processing, Mar. 2011, pp. 765-783, vol. 102, Issue 4.

* cited by examiner

FIG. 1

(Prior art)

DEEP NEURAL NETWORK TRAINING WITH NATIVE DEVICES

BACKGROUND

Technical Field

The present invention relates to neural networks and, more particularly, to architectures employing resistive processing units to implement back-propagation for training of the network.

Description of the Related Art

An artificial neural network (ANN) is an information processing system that is inspired by biological nervous systems, such as the brain. The key element of ANNs is the structure of the information processing system, which includes a large number of highly interconnected processing elements (called "neurons") working in parallel to solve specific problems. ANNs are furthermore trained in-use, with learning that involves adjustments to weights that exist between the neurons. An ANN is configured for a specific application, such as pattern recognition or data classification, through such a learning process.

Figure 1:
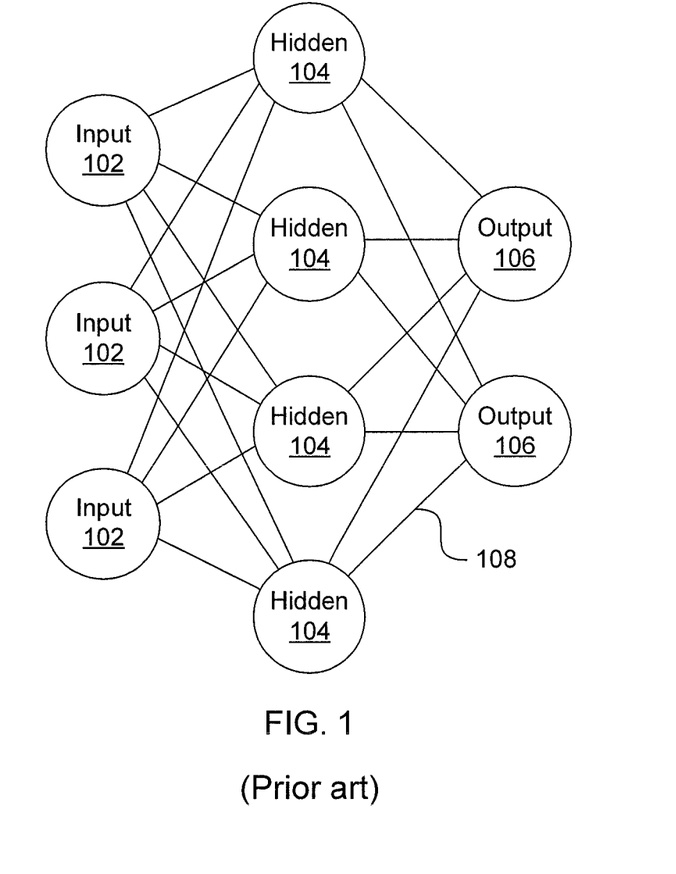
FIG. 1 is a diagram of an artificial neural network (ANN)

Referring now to FIG. 1, a generalized diagram of a neural network is shown. ANNs demonstrate an ability to derive meaning from complicated or imprecise data and can be used to extract patterns and detect trends that are too complex to be detected by humans or other computer-based systems. The structure of a neural network is known generally to have input neurons 102 that provide information to one or more "hidden" neurons 104. Connections 108 between the input neurons 102 and hidden neurons 104 are weighted and these weighted inputs are then processed by the hidden neurons 104 according to some function in the hidden neurons 104, with weighted connections 108 between the layers. There may be any number of layers of hidden neurons 104, and as well as neurons that perform different functions. There exist different neural network structures as well, such as convolutional neural network, maxout network, etc. Finally, a set of output neurons 106 accepts and processes weighted input from the last set of hidden neurons 104.

This represents a "feed-forward" computation, where information propagates from input neurons 102 to the output neurons 106. Upon completion of a feed-forward computation, the output is compared to a desired output available from training data. The error relative to the training data is then processed in "feed-back" computation, where the hidden neurons 104 and input neurons 102 receive information regarding the error propagating backward from the output neurons 106. Once the backward error propagation has been completed, weight updates are performed, with the weighted connections 108 being updated to account for the received error.

ANNs are conventionally implemented as software or with complicated weighting circuitry.

SUMMARY

An artificial neural network includes multiple neurons, including a layer of input neurons, one or more layers of hidden neurons, and a layer of output neurons. Arrays of weights are configured to accept voltage pulses from a first layer of neurons and to output current to a second layer of neurons during a feed forward operation. Each array of weights includes multiple resistive processing units having respective settable resistances.

A method of performing computations with an artificial neural network includes applying voltage pulses from a first layer of neurons to an array of weights comprising a plurality of resistive processing units, each having a respective settable resistance, to produce an output current to a second layer of neurons during a feed-forward operation. Error voltage pulses are applied from the second layer of neurons to the array of weights to produce error currents to the first layer of neurons during a back propagation operation. Weight update voltage pulses are applied from the first and second layer of neurons to the array of weights in accordance with local error values to set the respective settable resistances of each resistive processing units in the array of weights.

These and other features and advantages will become apparent from the following detailed description of illustrative embodiments thereof, which is to be read in connection with the accompanying drawings.

BRIEF DESCRIPTION OF THE SEVERAL VIEWS OF THE DRAWINGS

The disclosure will provide details in the following description of preferred embodiments with reference to the following figures wherein.

DETAILED DESCRIPTION

Embodiments of the present invention provide a neural network architecture based on resistive state devices that store information as a resistance, where the resistance encodes a weight for a given connection between two neurons. An array of such resistive state devices is used to encode all of the weights for all of the connections between two levels of neurons. The present embodiments also provide neuron circuitry that can change the stored state of the weights, thereby providing feed-forward propagation, back propagation, and weight updates in a simple architecture.

Figure 2:
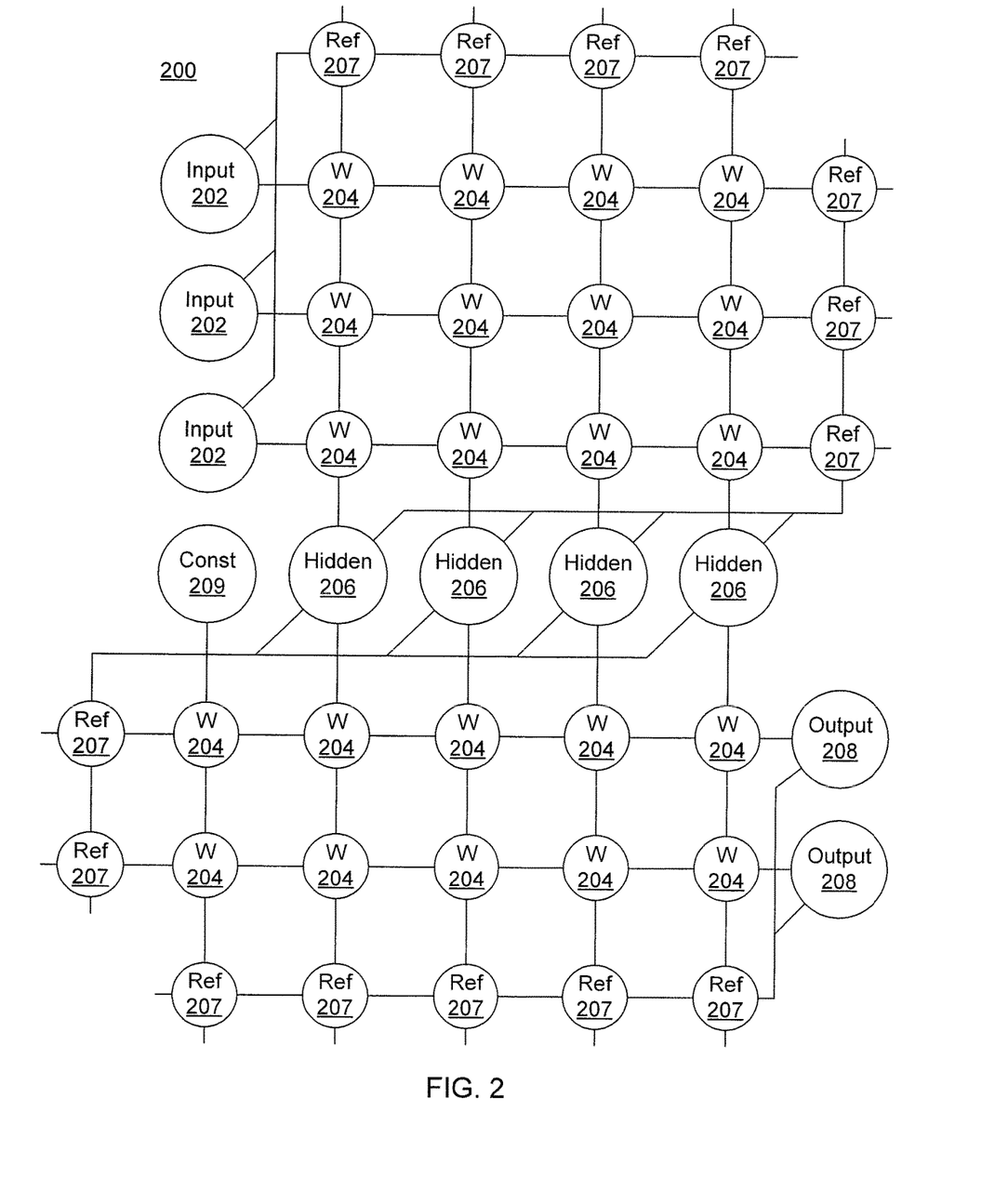
FIG. 2 is a diagram of an ANN including arrays of weights in accordance with the present principles.

Referring now to the drawings in which like numerals represent the same or similar elements and initially to FIG. 2, an artificial neural network (ANN) architecture 200 is shown. During feed-forward operation, a set of input neurons 202 each provide an input voltage in parallel to a respective row of weights 204. The weights 204 each have a settable resistance value, such that a current output flows from the weight 204 to a respective hidden neuron 206 to represent the weighted input. The current output by a given weight is determined as $I=v/r$, where V is the input voltage from the input neuron 202 and r is the set resistance of the weight 204. The current from each weight adds column-wise and flows to a hidden neuron 206. A set of reference weights 207 have a fixed resistance and combine their outputs into a reference current that is provided to each of the hidden neurons 206. Because conductance values can only be positive numbers, some reference conductance is needed to encode both positive and negative values in the matrix. The currents produced by the weights 204 are continuously valued and positive, and therefore the reference weights 207 are used to provide a reference current, above which currents are considered to have positive values and below which currents are considered to have negative values.

As an alternative to using the reference weights 207, another embodiment may use separate arrays of weights 204 to capture negative values. Each approach has advantages and disadvantages. Using the reference weights 207 is more efficient in chip area, but reference values need to be matched closely to one another. In contrast, the use of a separate array for negative values does not involve close matching as each value has a pair of weights to compare against. However, the negative weight matrix approach uses roughly twice the chip area as compared to the single reference weight column. In addition, the reference weight column generates a current that needs to be copied to each neuron for comparison, whereas a negative matrix array provides a reference value directly for each neuron. In the negative array embodiment, the weights 204 of both positive and negative arrays are updated, but this also increases signal-to-noise ratio as each weight value is a difference of two conductance values. The two embodiments provide identical functionality in encoding a negative value and those having ordinary skill in the art will be able to choose a suitable embodiment for the application at hand.

The hidden neurons 206 use the currents from the array of weights 204 and the reference weights 207 to perform some calculation. The hidden neurons 206 then output a voltage of their own to another array of weights 207. This array performs in the same way, with a column of weights 204 receiving a voltage from their respective hidden neuron 206 to produce a weighted current output that adds row-wise and is provided to the output neuron 208.

It should be understood that any number of these stages may be implemented, by interposing additional layers of arrays and hidden neurons 206. It should also be noted that some neurons may be constant neurons 209, which provide a constant voltage to the array. The constant neurons 209 can be present among the input neurons 202 and/or hidden neurons 206 and are only used during feed-forward operation.

During back propagation, the output neurons 208 provide a voltage back across the array of weights 204. The output layer compares the generated network response to training data and computes an error. The error is applied to the array as a voltage pulse, where the height and/or duration of the pulse is modulated proportional to the error value. In this example, a row of weights 204 receives a voltage from a respective output neuron 208 in parallel and converts that voltage into a current which adds column-wise to provide an input to hidden neurons 206. The hidden neurons 206 provide combine the weighted feedback signal with a derivative of its feed-forward calculation and stores an error value before outputting a feedback signal voltage to its respective column of weights 204. This back propagation travels through the entire network 200 until all hidden neurons 206 and the input neurons 202 have stored an error value.

During weight updates, the input neurons 202 and hidden neurons 206 apply a first weight update voltage forward and the output neurons 208 and hidden neurons 206 apply a second weight update voltage backward through the network 200. The combinations of these voltages create a state change within each weight 204, causing the weight 204 to take on a new resistance value. In this manner the weights 204 can be trained to adapt the neural network 200 to errors in its processing. It should be noted that the three modes of operation, feed forward, back propagation, and weight update, do not overlap with one another.

Figure 3:
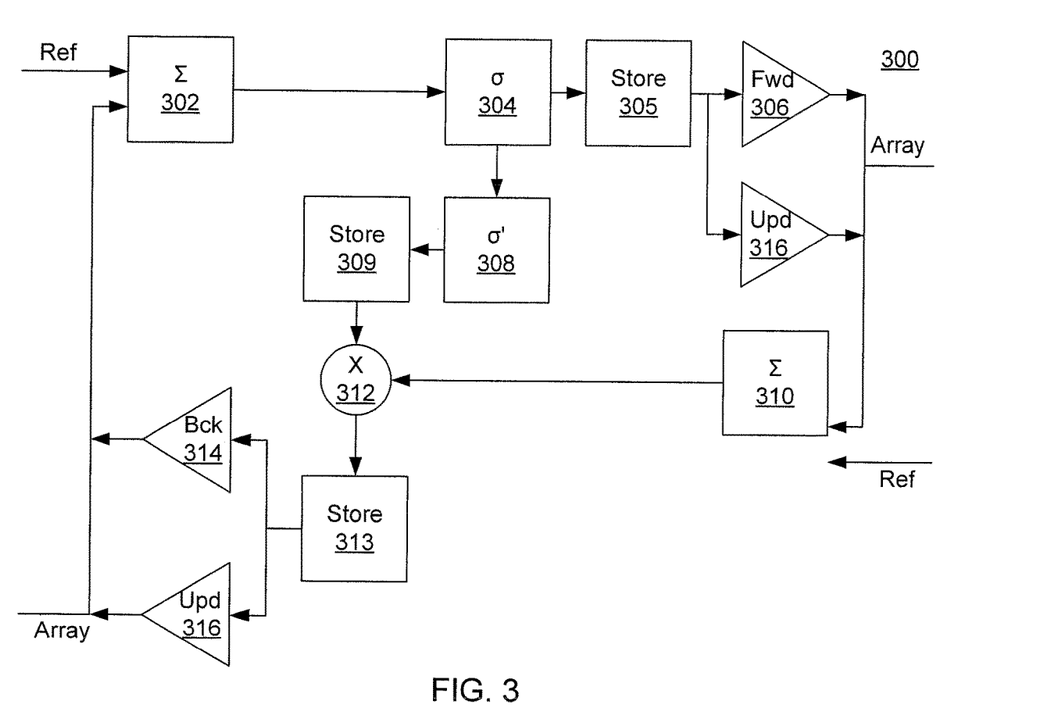
FIG. 3 is a block diagram of a neuron in an ANN in accordance with the present principles.

Referring now to FIG. 3, a block diagram of a neuron 300 is shown. This neuron may represent any of the input neurons 202, the hidden neurons 206, or the output neurons 208. It should be noted that FIG. 3 shows components to address all three phases of operation: feed forward, back propagation, and weight update. However, because the different phases do not overlap, there will necessarily be some form of control mechanism within in the neuron 300 to control which components are active. It should therefore be understood that there may be switches and other structures that are not shown in the neuron 300 to handle switching between modes.

In feed forward mode, a difference block 302 determines the value of the input from the array by comparing it to the reference input. This sets both a magnitude and a sign (e.g., + or −) of the input to the neuron 300 from the array. Block 304 performs a computation based on the input, the output of which is stored in storage 305. It is specifically contemplated that block 304 computes a non-linear function and may be implemented as analog or digital circuitry or may be performed in software. The value determined by the function block 304 is converted to a voltage at feed forward generator 306, which applies the voltage to the next array. The signal propagates this way by passing through multiple layers of arrays and neurons until it reaches the final output layer of neurons. The input is also applied to a derivative of the non-linear function in block 308, the output of which is stored in memory 309.

During back propagation mode, an error signal is generated. The error signal may be generated at an output neuron 208 or may be computed by a separate unit that accepts inputs from the output neurons 208 and compares the output to a correct output based on the training data. Otherwise, if the neuron 300 is a hidden neuron 206, it receives back propagating information from the array of weights 204 and compares the received information with the reference signal at difference block 310 to provide a continuously valued, signed error signal. This error signal is multiplied by the derivative of the non-linear function from the previous feed forward step stored in memory 309 using a multiplier 312, with the result being stored in the storage 313. The value determined by the multiplier 312 is converted to a backwards propagating voltage pulse proportional to the computed error at back propagation generator 314, which applies the voltage to the previous array. The error signal propagates in this way by passing through multiple layers of arrays and neurons until it reaches the input layer of neurons 202.

During weight update mode, after both forward and backward passes are completed, each weight 204 is updated proportional to the product of the signal passed through the weight during the forward and backward passes. The update signal generators 316 provide voltage pulses in both directions (though note that, for input and output neurons, only one direction will be available). The shapes and amplitudes of the pulses from update generators 316 are configured to change a state of the weights 204, such that the resistance of the weights 204 is updated.

In general terms, the weights 204 are implemented as resistive cross point devices, where their switching characteristics have a non-linearity that can be used for processing data. The weights 204 belong to a class of device called a resistive processing unit (RPU), because their non-linear characteristics are used to perform calculations in the neural network 200. The RPU devices may be implemented with resistive random access memory (RRAM), phase change memory (PCM), programmable metallization cell (PMC) memory, or any other other device that has non-linear resistive switching characteristics. The RPU devices may also be considered as memristive systems, but they differ in their principle of operation as compared to an ideal memristor.

Figure 4:
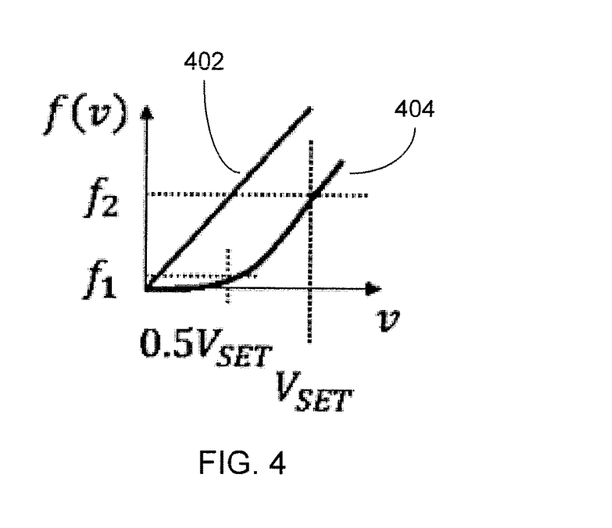
FIG. 4 is a diagram of the voltage switching behavior of a resistive processing unit in accordance with the present principles.

Referring now to FIG. 4, a graph illustrating a comparison between an ideal memristor and an RPU of the present embodiments is shown. The vertical axis represents device state change at a particular voltage, the horizontal axis represents the voltage applied. In an ideal memristor operation, a change in resistance is linearly proportional to the voltage applied to the device. Thus, as soon as the memristor sees any voltage, its resistance state changed. This is shown by curve 402, which shows that the change in state is dramatic even at low voltages.

For RPU devices, shown by the curve 404, there is a well-defined set voltage, $V_{SET}$, that the device needs to see to change its internal resistance state. For such a device, a bias voltage of $0.5V_{SET}$ will not change the internal resistance state. In the present embodiments, this non-linear characteristic of the RPU device is exploited to perform multiplication locally. Assuming $f_1$ is small, the device will not change its internal state when only $0.5V_{SET}$ is applied. Notably, the figure shown is with only positive voltages and positive changes to the resistive state of the RPU device, but a similar relationship between negative voltages and negative resistance changes also exists.

The update generators 316 generate the voltage pulses that are applied to the two-dimensional array of weights 204 in parallel. These circuits generate independent bit streams called stochastic numbers, where the probability of a "one" in the stream is proportional to the number that is encoded.

Figure 5:
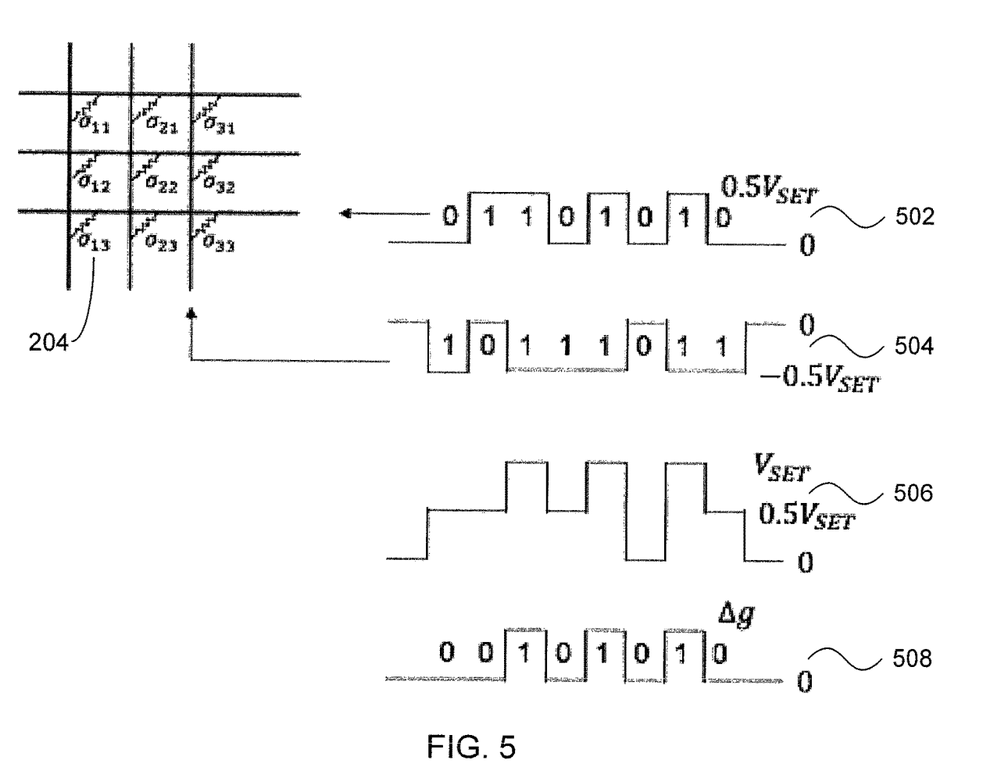
FIG. 5 is a diagram of a weight update operation in accordance with the present principles.

Referring now to FIG. 5, a diagram shows the operation of positive weight updates for an RPU device 204 is shown. A row voltage sequence 502 is shown as a sequence of voltage pulses, one at each weight update, either having a voltage of zero or a voltage of $+0.5V_{SET}$. A column voltage sequence 504 is shown as a sequence of voltage pulses, either having a voltage of zero or a voltage of $-0.5V_{SET}$. It should be understood that these sequences represent a positive resistance change phase of the weight update. After the positive weight updates are performed, a separate set of sequences, with the polarity of the respective voltages reversed, is used to update weights in a negative direction for those weights 204 that need such correction.

At each weigh update phase, the two voltages align for a given RPU 204 to produce the device voltage sequence 506, which ranges from 0 to $V_{SET}$. This results in a change in device conductance as shown in the sequence 508, where device conductance changes only when the voltage reaches $V_{SET}$, such that the device state is changed only when both transmit a '1' bit.

The update generators 316 encode the numbers as stochastic bit streams, where each bit is encoded with a voltage pulse height. In this example, $4/8$ is encoded by the row voltage 502 and $6/8$ is encoded by the column voltage 504. The overlapping signal 506, defined by the difference between the column and row voltages seen by the cross point device, has three voltage steps. The stored weight proportional to the product of the two stochastic numbers (here shown as $4/8 \times 6/8 = 3/8$) is stored as the value of the weight of device 204.

Figure 6:
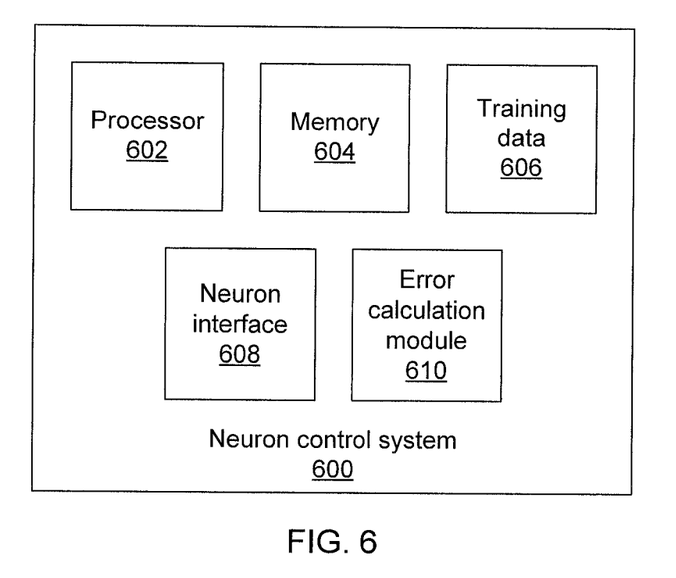
FIG. 6 is a block diagram of a neuron control system in accordance with the present principles.

Referring now to FIG. 6, a neuron control system 600 is shown. The neuron control system 600 includes a hardware processor 602 and memory 604. Training data 606 for an ANN is stored in the memory 606 and is used to train weights of the ANN. A neuron interface 608 controls neurons on the ANN, determining whether the neurons are in feed forward mode, back propagation mode, or weight update mode. The neuron interface 608 furthermore provides inputs to input neurons and receives the output from output neurons. An error calculation module 610 compares the outputs from the neurons to training data 606 to determine an error signal. Neuron interface 608 applies the error signal to the output neurons during a back propagation mode and subsequently triggers a weight update mode to train the weights of the ANN accordingly.

Figure 7:
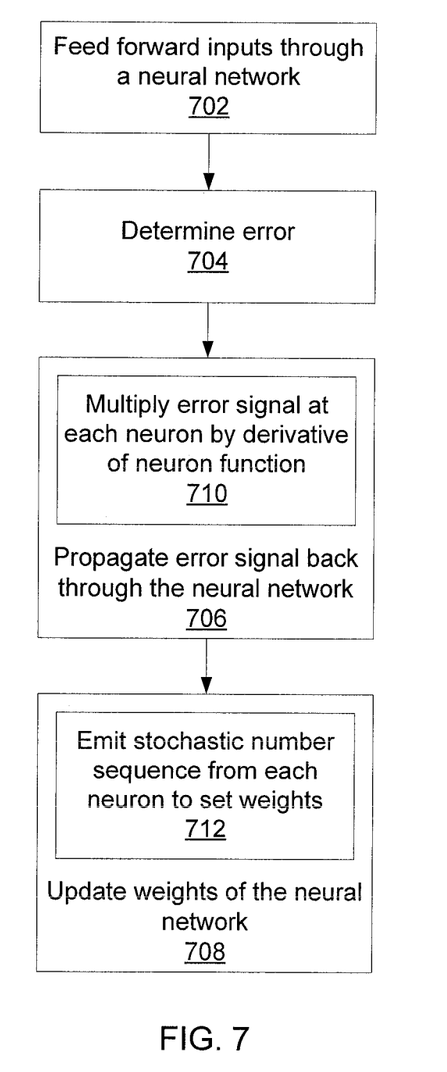
FIG. 7 is a block/flow diagram of a method for performing computations in an ANN in accordance with the present principles.

Referring now to FIG. 7, a method for training a neural network is shown. Block 702 feeds forward inputs through the neural network to perform a calculation as described above. Block 704 determines an error by comparing the output of the neural network to training data following the feed forward phase. Block 706 then propagates an error signal back through the neural network, after which block 708 updates the weights of the neural network. Propagating the error signal back 706 includes multiplying the error signal at each neuron 300 by the derivative of the neuron function 308 in block 710, while updating the weights of the neural network 708 includes emitting a stochastic number sequence from each neuron 300 to its adjacent arrays to set the resistance value of the weights 204.

Parts of the present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of deep neural network training with native devices (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

The invention claimed is:

1. An artificial neural network (ANN), comprising:
a plurality of neurons, comprising a layer of input neurons, one or more layers of hidden neurons, and a layer of output neurons;
a plurality of arrays of weights, each array of weights being configured to accept voltage pulses from a first layer of neurons and to output current to a second layer of neurons during a feed forward operation, each array of weights comprising a plurality of resistive processing units having respective settable resistances, wherein each hidden neuron is configured to output a first weight update voltage pulse to a first array of the plurality of arrays in a forward direction and a second weight update voltage pulse to a second array in the plurality of arrays in a backward direction during a weight update operation, with each array of weights being configured to receive weight update voltage pulses from two different neuron layers at a same time in accordance with local error values.

2. The ANN of claim 1, wherein each neuron comprises:
a feed forward chain, implemented by the plurality of neurons, configured to apply a computation based on an input current and further configured to output a result of the computation as a voltage pulse;
a back propagation chain, implemented by the plurality of neurons, configured to apply a computation based on an error current and a derivative of the computation of the feed forward chain and further configured to output an error voltage pulse; and
one or more weight update generators, each including a voltage source that is configured to output a weight update voltage pulse in accordance with a local error value.

3. The ANN of claim 2, wherein the weight update voltage pulse comprises a stochastic number encoded as a voltage pulse that has a magnitude of half of a voltage needed to change the settable resistance of a resistive processing unit.

4. The ANN of claim 3, wherein weight update voltage pulses from two neurons converge on a resistive processing unit during weight update mode and change the settable resistance of the resistive processing unit in proportion to a number of points in the respective stochastic numbers that both have a voltage magnitude that represents a logical state.

5. The ANN of claim 3, wherein the weight update voltage pulse comprises two stochastic numbers, each providing a respective direction of resistance changes and each having opposite polarity from the other.

6. The ANN of claim 2, wherein the input current is compared to a reference current to determine a sign and magnitude of an input to the computation.

7. The ANN of claim 1, wherein each array of weights further comprises one or more reference weights having a static resistance.

8. The ANN of claim 1, wherein each array of weights applies the voltage pulse from each of the first layer of neurons to an entire row or column of resistive processing units in parallel.

9. The ANN of claim 1, wherein each array of weights sums currents from an entire row or column of resistive processing units to form an output current.

10. The ANN of claim 1, wherein one or more of the input neurons and hidden neurons is a voltage source configured to provide a constant voltage output during feed forward operation.

11. The ANN of claim 1, wherein the first weight update voltage pulse is based on a non-linear neuron function and wherein the second weight update voltage pulse is based on a derivative of the non-linear neuron function.

12. The ANN of claim 1, wherein the weight update operation and the feed forward operation are performed at different times.

13. A method of performing computations with an artificial neural network, comprising:
applying voltage pulses from a first layer of neurons to an array of weights comprising a plurality of resistive processing units, each having a respective settable resistance, to produce an output current to a second layer of neurons during a feed-forward operation;
applying error voltage pulses from the second layer of neurons to the array of weights to produce error currents to the first layer of neurons during a back propagation operation; and
applying weight update voltage pulses from the first and second layer of neurons at a same time to each resistive processing unit in the array of weights in accordance with local error values to set the respective settable resistances of each resistive processing unit in the array of weights.

14. The method of claim 13, further comprising:
performing a computation at the second layer of neurons based on the output current during the feed-forward operation, wherein the output of the computation of is a computed voltage pulse; and
determining the error voltage pulse based on a derivative of the computation during the back propagation operation.

15. The method of claim 14, wherein performing the computation comprises comparing the output current to a reference current to determine a sign and magnitude of an input to the computation.

16. The method of claim 13, wherein the weight update voltage pulse comprises a stochastic number encoded as a voltage pulse that has a magnitude of half of a voltage needed to change the settable resistance of a resistive processing unit.

17. The method of claim 16, wherein weight update voltage pulses from two neurons converge on a resistive processing unit at a same time during weight update mode and change the settable resistance of the resistive processing unit in proportion to a number of points in the respective stochastic numbers that both have a voltage magnitude that represents a logical state.

18. The method of claim 16, wherein the weight update voltage pulse comprises two stochastic numbers, each providing a respective direction of resistance changes and each having opposite polarity from the other.

19. The method of claim 13, wherein applying voltage pulses from the first layer of neurons to the array of weights comprises applying a voltage pulse from each of the first layer of neurons to an entire row or column of resistive processing units in parallel.

20. The method of claim 13, wherein each array of weights sums currents from an entire row or column of resistive processing units to form an output current.

* * * * *